(12) United States Patent
Leko et al.

(10) Patent No.: US 10,400,826 B2
(45) Date of Patent: Sep. 3, 2019

(54) PROPSHAFT ASSEMBLY WITH YOKE ADHESIVELY COUPLED TO PROPSHAFT TUBE

(71) Applicant: American Axle & Manufacturing, Inc., Detroit, MI (US)

(72) Inventors: Michael J. Leko, Traverse City, MI (US); Jose Luis Medina, Silao (MX); Jeffrey E. Rea, Royal Oak, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 161 days.

(21) Appl. No.: 15/229,143

(22) Filed: Aug. 5, 2016

(65) Prior Publication Data

US 2017/0051791 A1  Feb. 23, 2017

Related U.S. Application Data

(60) Provisional application No. 62/208,002, filed on Aug. 21, 2015.

(51) Int. Cl.
*F16D 3/38* (2006.01)
*F16D 1/068* (2006.01)

(52) U.S. Cl.
CPC ............. *F16D 3/387* (2013.01); *F16D 1/068* (2013.01)

(58) Field of Classification Search
CPC ................................. F16D 3/387; F16D 1/068
USPC .................................................... 264/171.22
See application file for complete search history.

(56) References Cited

U.S. PATENT DOCUMENTS

| 4,279,275 | A | | 7/1981 | Stanwood et al. |
| 5,601,494 | A | | 2/1997 | Duggan |
| 5,632,685 | A | | 5/1997 | Myers |
| 5,647,683 | A | | 7/1997 | Easley |
| 5,716,276 | A | | 2/1998 | Mangas et al. |
| 5,836,823 | A | * | 11/1998 | Shellaberger ........... F16D 3/387 464/134 |

(Continued)

OTHER PUBLICATIONS

Biron, Michel. Thermosets and Composites. Chapter 4. Available at https://www.sciencedirect.com/topics/chemistry/glass-transition-temperature. online search. (Year: 2004).*

*Primary Examiner* — Christopher T Schatz
(74) *Attorney, Agent, or Firm* — Harness, Dickey & Pierce, P.L.C.

(57) ABSTRACT

A method for forming a propshaft assembly that includes: providing a propshaft tube having a wall member that defines an inner tubular surface; providing a yoke with a yoke body and a pair of yoke arms that extend from the yoke body, the yoke body defining first and second locating portions and an adhesive groove that is disposed between the first and second locating portions; assembling the yoke to the propshaft tube such that the first locating portion engages the inner tubular surface in a slip-fit manner and the second locating portion engages the inner tubular surface in an interference-fit manner; heating the propshaft tube and the yoke; and injecting an adhesive through the propshaft tube into the adhesive groove when the propshaft tube and the yoke are at a temperature that is greater than or equal to a predetermined minimum adhesive injection temperature. A propshaft assembly is also provided.

9 Claims, 4 Drawing Sheets

(56) References Cited

U.S. PATENT DOCUMENTS

| | | | |
|---|---|---|---|
| 6,245,183 B1* | 6/2001 | Iorio | ................... B29C 63/486 156/244.14 |
| 7,014,219 B2 | 3/2006 | Hoppenz et al. | |
| 7,278,212 B2 | 10/2007 | Bommarito | |
| 7,485,045 B2 | 2/2009 | Williams | |
| 8,597,131 B2 | 12/2013 | Pisinger | |
| 2010/0025982 A1 | 2/2010 | Jamison | |
| 2015/0091291 A1* | 4/2015 | Conrad | ................ F16L 13/116 285/21.1 |

\* cited by examiner

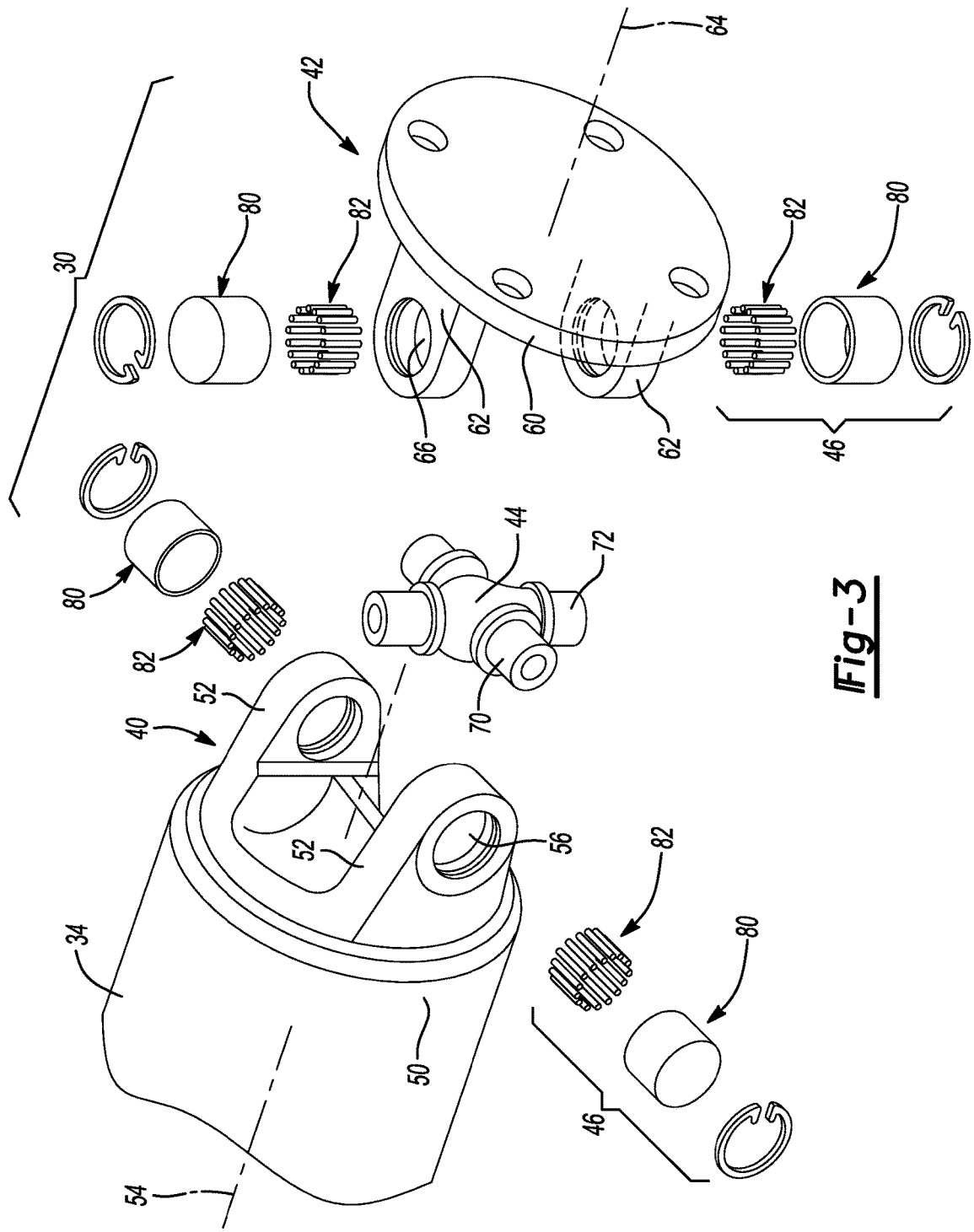

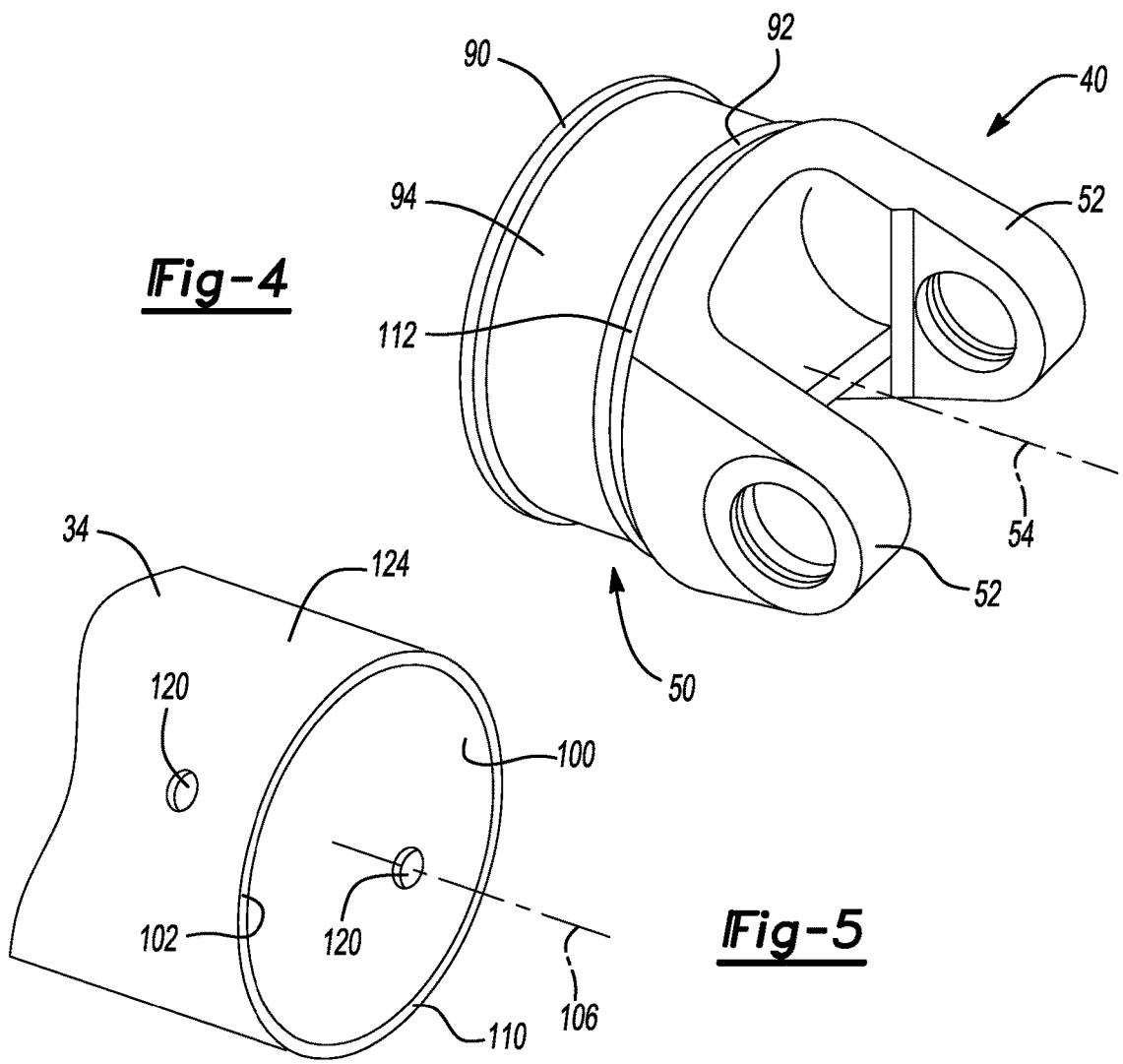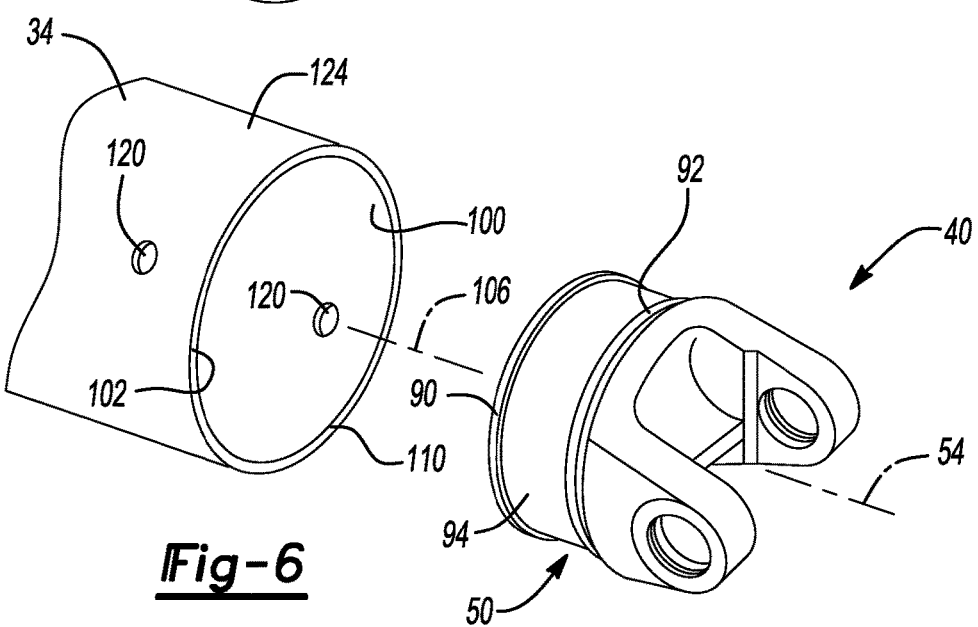

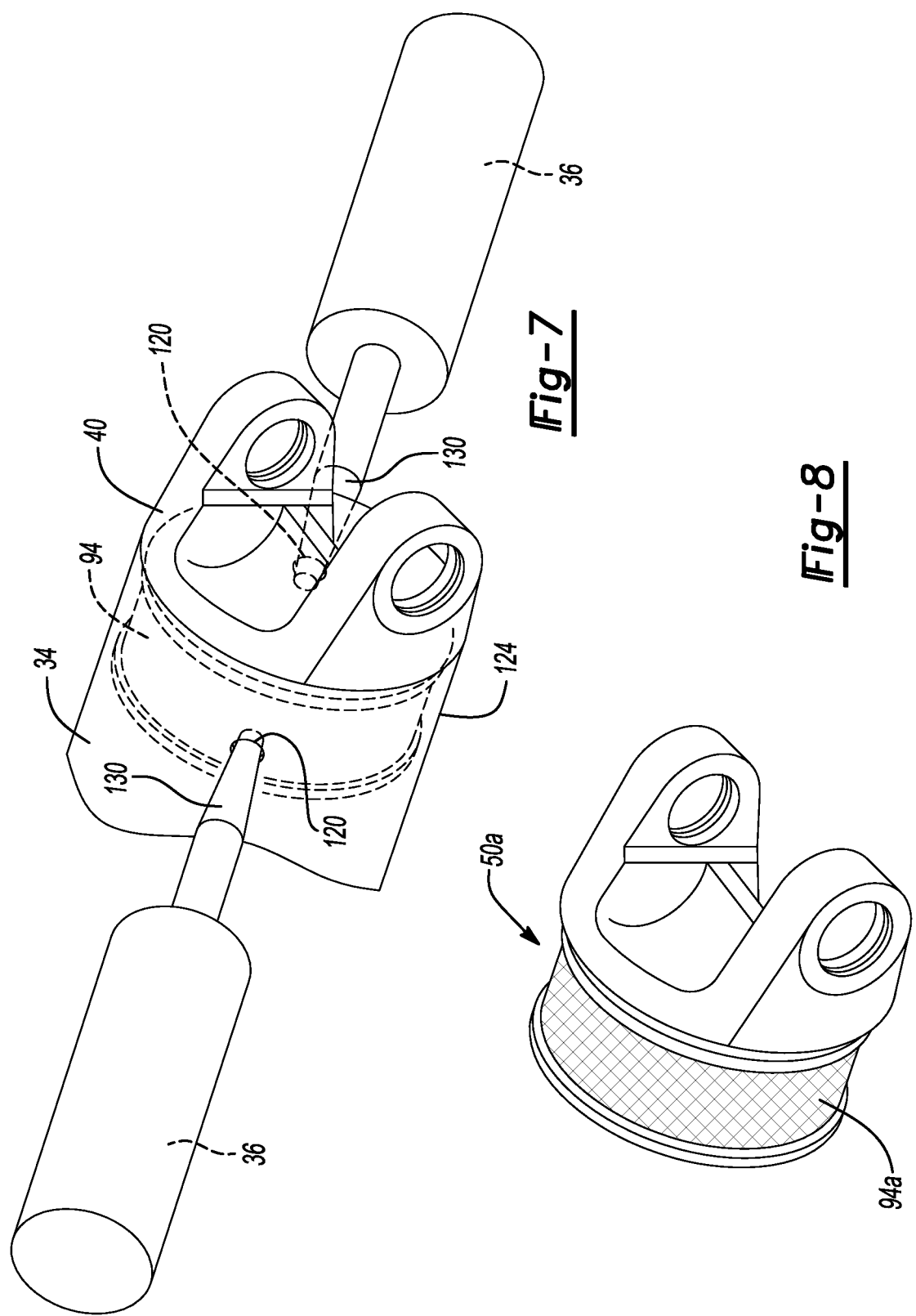

PROPSHAFT ASSEMBLY WITH YOKE ADHESIVELY COUPLED TO PROPSHAFT TUBE

CROSS-REFERENCE TO RELATED APPLICATIONS

This application claims the benefit of U.S. Provisional Patent Application No. 62/208,002 filed Aug. 21, 2015, the disclosure of which is incorporated by reference as if fully set forth in detail herein.

FIELD

The present disclosure relates to a propshaft assembly having a yoke that is adhesively coupled to a propshaft tube.

BACKGROUND

This section provides background information related to the present disclosure which is not necessarily prior art.

Propshaft assemblies for modern automotive vehicles typically include a propshaft tube that is welded on its opposite ends to a weld yoke structure. Common welding processes for coupling the weld yoke structure to the propshaft tube include MIG (metal inert gas) welding and friction welding. While such welding processes are suitable for their intended purposes, they are known in the art to have certain drawbacks. For example, some materials, such as 7XXX aluminum alloys (e.g., 7075-T6), can be difficult or impossible to weld in a cost-effective and high-volume manner. Moreover, the heat of the weld can affect the strength of a portion of the propshaft tube and/or could cause distortion of the propshaft tube.

It is known in the art to employ adhesives to bond a yoke to a propshaft tube. Adhesives typically do not affect the strength of the propshaft tube and typically do not cause distortion of the propshaft tube. Despite these advantages, we are unaware of any adhesive-based propshaft assembly manufacturing process that is suitable to high volume manufacture. For example, U.S. Pat. No. 7,485,045 describes a drive shaft assembly process in which an adhesive is injected into an injection port in an end fitting and pressure is maintained on the adhesive in the injection port for preferably at least 5 to 10 minutes to fully drive the adhesive into a space between a tube and the end fitting. While such process is suitable for its intended purpose, it is not suited for high volume commercial production that is necessary for a modern automotive vehicle.

SUMMARY

This section provides a general summary of the disclosure, and is not a comprehensive disclosure of its full scope or all of its features.

In one form, the present disclosure provides a propshaft assembly having a propshaft tube, a universal joint and an adhesive. The propshaft tube has a wall member that defines an inner tubular surface. The propshaft tube has a first axial end face and a first injection port that is disposed proximate the first axial end face. The universal joint has a yoke with a yoke body and a pair of yoke arms that extend from the yoke body. The yoke body defines first and second locating portions and an adhesive groove that is disposed between the first and second locating portions. The first locating portion is sized to slip fit with the inner tubular surface. The second locating portion engages the inner tubular surface by way of an interference fit. The adhesive is disposed in the adhesive groove and the first injection port and adhesively couples the yoke to the propshaft tube.

In another form, the present disclosure provides a method for forming a propshaft assembly. The method includes: providing a propshaft tube having a wall member that defines an inner tubular surface; providing a yoke with a yoke body and a pair of yoke arms that extend from the yoke body, the yoke body defining first and second locating portions and an adhesive groove that is disposed between the first and second locating portions; assembling the yoke to the propshaft tube such that the first locating portion engages the inner tubular surface in a slip-fit manner and the second locating portion engages the inner tubular surface in an interference-fit manner; heating the propshaft tube and the yoke; and injecting an adhesive through the propshaft tube into the adhesive groove when the propshaft tube and the yoke are at a temperature that is greater than or equal to a predetermined minimum adhesive injection temperature.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is an exploded perspective view of a portion of the propshaft assembly of FIG. 1, depicting a first universal joint in more detail;

FIG. 4 is a perspective view of a portion of the propshaft assembly of FIG. 1, illustrating a first yoke in more detail;

FIG. 5 is a perspective view of a portion of the propshaft assembly of FIG. 1, illustrating an axial end of a propshaft tube in more detail;

FIG. 6 is an exploded perspective view of a portion of the propshaft assembly of FIG. 1, illustrating the first yoke exploded from the propshaft tube;

FIG. 7 is a perspective view illustrating a step in the manufacture of the propshaft assembly of FIG. 1, the figure depicting a pair of nozzles injecting an adhesive into a space between the propshaft tube and the first yoke; and FIG. 8 is a perspective view illustrating an alternately constructed first yoke.

Corresponding reference numerals indicate corresponding parts throughout the several views of the drawings.

DETAILED DESCRIPTION

Figure 1:
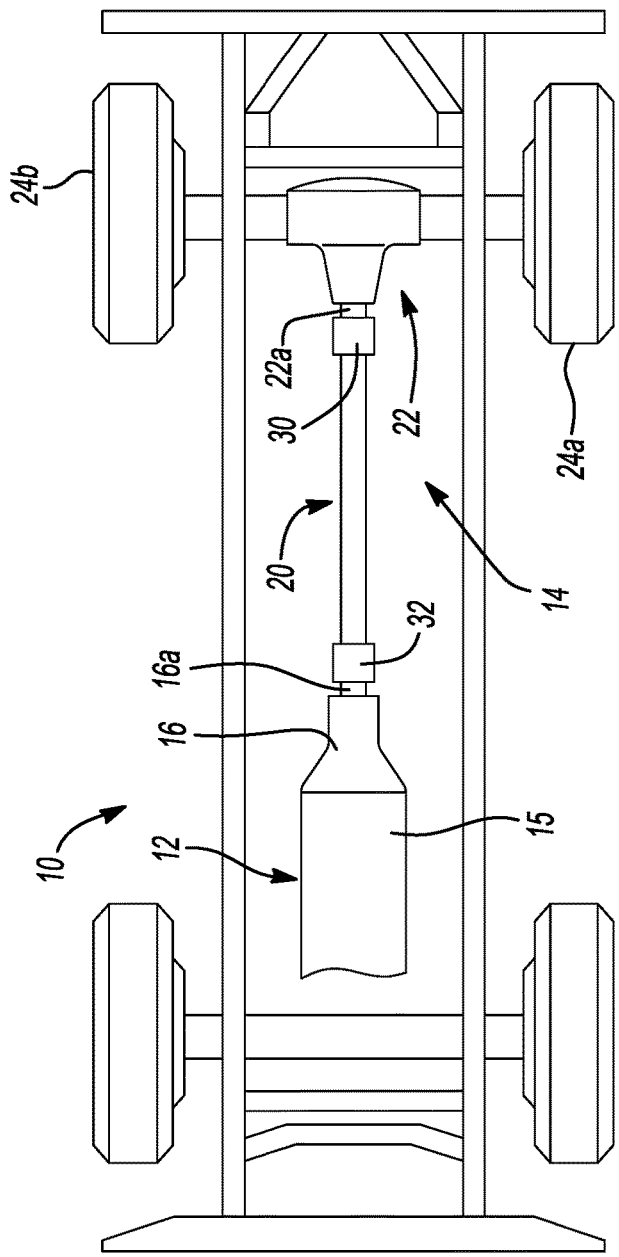
FIG. 1 is a schematic illustration of a propshaft assembly constructed in accordance with the teachings of the present disclosure, the propshaft assembly being depicted in a drivetrain of an exemplary automotive vehicle.

With reference to FIG. 1, a vehicle having a propshaft constructed in accordance with the teachings of the present disclosure is schematically illustrated. The vehicle 10 includes a power train 12 and a drivetrain 14. The power train 12 can include a power source, such as an internal combustion engine 15, and a transmission 16 that can cooperate to provide rotary power to the drivetrain 14. The drivetrain 14 can include a propshaft assembly 20 and an axle assembly 22 that cooperate to transmit rotary power to a pair of drive wheels 24a, 24b. The powertrain 12 and the axle assembly 22 can be conventional in their construction and operation and as such, a detailed discussion of these components need not be provided herein. The propshaft assembly 20 is configured to transmit rotary power between an output shaft 16a of the transmission 16 and an input pinion shaft 22a of the axle assembly 22.

Figure 2:
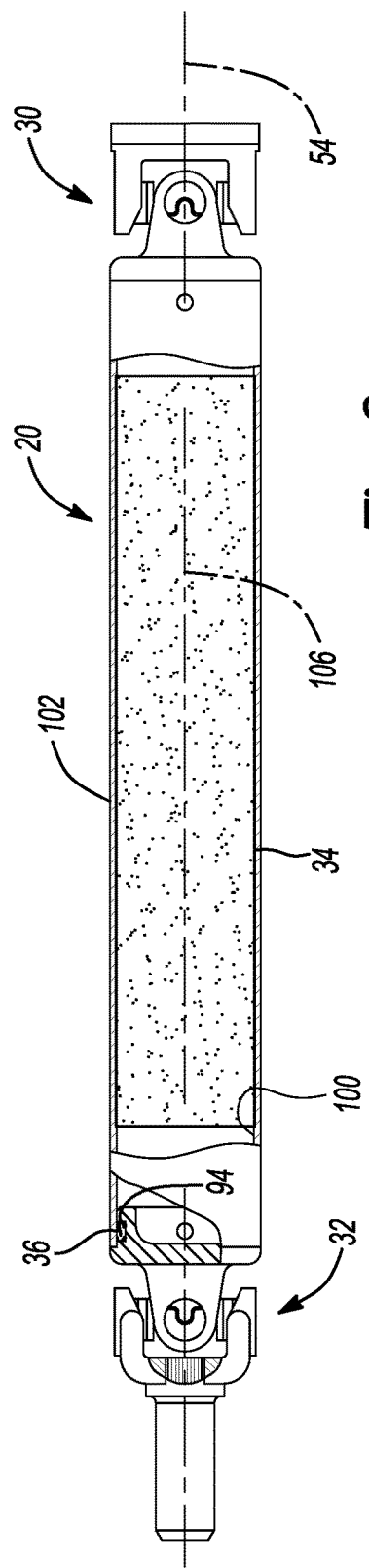
FIG. 2 is a partly sectioned side elevation view of the propshaft assembly of FIG. 1.

With reference to FIG. 2, the propshaft assembly 20 can include a first universal joint 30, a second universal joint 32, a propshaft tube 34 and an adhesive 36. The propshaft tube 34 can be formed of a desired material, such as 6XXX, 5XXX, 2XXX or 7XXX aluminum alloys (e.g., 6061-T6, 7075-T6) or steel. The propshaft tube 34 can be a seamless tubular structure (e.g., extrusion) or could be a welded tubular structure.

With reference to FIGS. 2 and 3, the first and second universal joints 30 and 32 are generally similar and as such a discussion of the first universal joint 30 will suffice for both. The first universal joint 30 can have a first yoke 40, a second yoke 42, a cross-shaft 44 and a plurality of bearing assemblies 46. The first yoke 40 can have a first yoke body 50 and a pair of first yoke arms 52 that extend from the first yoke body 50. The first yoke body 50 is configured to be fixedly coupled to the first tubular member 34 with an adhesive material as will be discussed in greater detail below. The first yoke arms 52 are spaced 180 degrees apart from one another around a rotational axis 54 of the first yoke 40. Each of the first yoke arms 52 defines a bore 56 that is configured to receive an associated one of the bearings assemblies 46 therein.

The second yoke 42 can have a second yoke body 60 and a pair of second yoke arms 62 that extend from the second yoke body 60. The second yoke body 60 is configured to be axially and non-rotatably coupled to the input pinion shaft 22a (FIG. 1) in a desired manner, such as with a plurality of bolts (not shown). Alternatively, the second yoke body 60 could be configured as a slip yoke that could be configured to be non-rotatably but axially slidably coupled to a power transmitting element, for example in the manner shown for the second universal joint 32. The second yoke arms 62 are spaced 180 degrees apart from one another around a rotational axis 64 of the second yoke 42. Each of the second yoke arms 62 defines a bore 66 that is configured to receive an associated one of the bearing assemblies 46 therein.

The cross-shaft 44 defines a pair of first trunnions 70, which are received into the bores 56 in the first yoke arms 52, and a pair of second trunnions 72 that are received into the bores 66 of the second yoke arms 62. Each of the bearing assemblies 46 comprises a bearing cup 80, which is engaged to a corresponding one of the first and second yoke arms 52 and 62, and a plurality of rollers 82 that are disposed between the bearing cup 80 and a corresponding one of the first and second trunnions 70 and 72. Accordingly, it will be appreciated that each of the first trunnions 70 is pivotally mounted to a corresponding one of the first yoke arms 52 and that each of the second trunnions 72 is pivotally mounted to a corresponding one of the second yoke arms 62.

With reference to FIGS. 4 through 6, the first yoke body 50 can include a first locating portion 90, a second locating portion 92 and an adhesive groove 94 that can be disposed axially between the first and second locating portions 90 and 92. The first locating portion 90, which can be disposed on an end of the first yoke body 50 that is opposite the first yoke arms 52, can be sized to engage an inner tubular surface 100 that is defined by a wall member 102 from which the propshaft tube 34 is formed. The second locating portion 92 can be disposed between the first yoke arms 52 and the first locating portion 90 and can be sized to engage the inner tubular surface 100 of the wall member 102 in a desired manner, such as an interference-fit. The first and second locating portions 90 and 92 can be sized to cooperate with the wall member 102 to align the rotational axis 54 of the first yoke 40 to a longitudinal axis 106 of the propshaft tube 34 when the first yoke body 50 is inserted into the propshaft tube 34. Moreover, the second locating portion 92 can be sized to cooperate with the wall member 102 to fixedly couple the first yoke 40 to the propshaft tube 34 to a degree that permits an intermediate assembly (i.e., an assembly that consists of the propshaft tube 34 and any of the first yokes 50 that are to be inserted into the propshaft tube 34) to be handled during the manufacturing of the propshaft assembly 20 (FIG. 1) and prior to the curing of the adhesive 36 (FIG. 2). In the particular example provided, the first locating portion 90 is sized in a manner (e.g., a slip fit) that aids in locating the rotational axis 54 of the first yoke 40 to the longitudinal axis 106 of the propshaft tube 34, but permits egress of air from the adhesive groove 94 when the adhesive 36 (FIG. 2) is injected into the space between the wall member 102 and the first yoke body 50 as will be discussed in more detail below. The degree of interference fit between the first yoke body 50 and the propshaft tube 34 can be selected to provide sufficient tolerance to handling, etc. during the manufacturing process so that the first yoke(s) 50 do not rotate relative to the propshaft tube 34 prior to the point in the process at which the adhesive 36 (FIG. 2) is fully cured. Additionally, the degree of interference fit between the first yoke body 50 and the propshaft tube 34 can be selected to inhibit the egress of the adhesive 36 (FIG. 2) (e.g., when the adhesive groove 94 is being filled or when the adhesive 36 (FIG. 2) between the wall member 102 and the first yoke body 50 is curing) at a location between an axial end face 110 of the propshaft tube 34 and a shoulder 112 on the first yoke body 50 that abuts the axial end face 110. In this regard, the first locating portion 90 can be sized relative to the propshaft tube 34 such that any adhesive 36 (FIG. 2) that exits the adhesive groove 94 when the adhesive 36 (FIG. 2) is being introduced between the first yoke body 50 and the propshaft tube 34 or when the adhesive 36 (FIG. 2) is curing can be directed away from the first yoke 40 so as to be contained within the propshaft tube 34 so that any excess adhesive does not adversely affect the cosmetic appearance of the finished propshaft assembly 20 (FIG. 2).

With reference to FIGS. 6 and 7, the adhesive 36 can be introduced to the adhesive groove 94 in any desired manner. For example, one or more injection ports 120 are formed into each axial end 124 of the propshaft tube 34 at locations that are spaced apart from the axial end faces 110 of the propshaft tube 34 by a distance that positions the injection ports 120 in-line with the adhesive grooves 94. In the particular example provided, two adhesive injection ports 120 are provided, with each adhesive injection port 120 being configured to receive adhesive 36 from an associated injection nozzle 130. It will be appreciated that the injection nozzles 130 are configured to sealingly engage the propshaft tube 34 when the adhesive 36 is dispensed from the injection nozzles 130.

Any desired adhesive can be employed. We have found that suitable adhesives typically have a glass transition temperature (when the adhesive is cured) that is greater than about 200° C., preferably greater than about 210° C. and still more preferably greater than about 220° C. We have also found that such adhesives are frequently thick, viscous liquids that may also include structural fillers, such as glass beads. Accordingly, it may be desirable in some situations to heat the adhesive 36 to a temperature that equals or exceeds a predetermined minimum adhesive temperature and/or one or more of the first yoke(s) 40 and the propshaft tube 34 to a temperature that equals or exceeds a predetermined minimum adhesive injection temperature. In the particular example provided, each of the adhesive 36, the first yoke 40 and the propshaft tube 34 are heated prior to injecting the adhesive 36 between the first yoke 40 and the propshaft tube 34. In our experiments, we have pre-heated the first yoke 40 and the propshaft tube 34 prior to their assembly, have assembled the preheated components together and have then injected the heated adhesive 36 between the first yoke 40 and the propshaft tube 34. It will be appreciated, however, that the first yoke 40 can be assembled to the propshaft tube 34 and thereafter the intermediate assembly can be heated to a desired temperature before the adhesive 36 is injected between the first yoke 40 and the propshaft tube 34. The predetermined minimum adhesive temperature and the predetermined minimum adhesive injection temperature can be dependent on the particular adhesive material that is employed in the assembly. We have found in our research, however, that these temperatures can be relatively low. In this regard, a temperature of about 100 or 120 degrees Fahrenheit for the predetermined minimum adhesive injection temperature is believed to provide satisfactory results.

Various features can be integrated into the first yoke 40 that are configured to increase the strength of the bond between the first yoke 40 and the adhesive 36. For example, a portion of the surface of the adhesive groove 94a can be textured as shown in FIG. 8, for example via knurling, to create surfaces a texture that can provide increased surface area on the first yoke body 50a and/or create structural features, such as ridges, that aid in mechanically locking the first yoke body 50a to the cured adhesive material that is to reside in the adhesive groove 94a.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming a propshaft assembly, the method comprising:
    providing a propshaft tube having a wall member that defines an inner tubular surface;
    providing a yoke with a yoke body and a pair of yoke arms that extend from the yoke body, the yoke body defining first and second locating portions and an adhesive groove that is disposed between the first and second locating portions;
    assembling the yoke to the propshaft tube such that the first locating portion engages the inner tubular surface in a slip-fit manner and the second locating portion engages the inner tubular surface in an interference-fit manner; and
    heating the propshaft tube and the yoke; and
    injecting an adhesive through the propshaft tube into the adhesive groove when the propshaft tube and the yoke are at a temperature that is greater than or equal to a predetermined minimum adhesive injection temperature.

2. The method of claim 1, wherein prior to injecting the adhesive, the method further comprises heating the adhesive to a predetermined minimum adhesive temperature.

3. The method of claim 1, wherein an injection port is formed through the propshaft tube and wherein the adhesive is injected through the injection port.

4. The method of claim 1, wherein a volume of air is disposed in the adhesive groove prior to injecting the adhesive and wherein a portion of the volume of air is urged between the wall member and the second locating portion when the adhesive is injected into the adhesive groove.

5. The method of claim 1, wherein the predetermined minimum adhesive injection temperature is greater than or equal to about 100 degrees Fahrenheit.

6. The method of claim 5, wherein the predetermined minimum adhesive injection temperature is about equal to 120 degrees Fahrenheit.

7. The method of claim 1, wherein the adhesive has a glass transition temperature that is greater than 200° C. when the adhesive is cured.

8. The method of claim 7, wherein the glass transition temperature is greater than 210° C.

9. The method of claim 8, wherein the glass transition temperature is greater than 220° C.

* * * * *